Jan. 26, 1943.         F. E. ARNDT              2,309,086
                    MATERIAL SPREADER
              Filed June 30, 1939           3 Sheets-Sheet 1
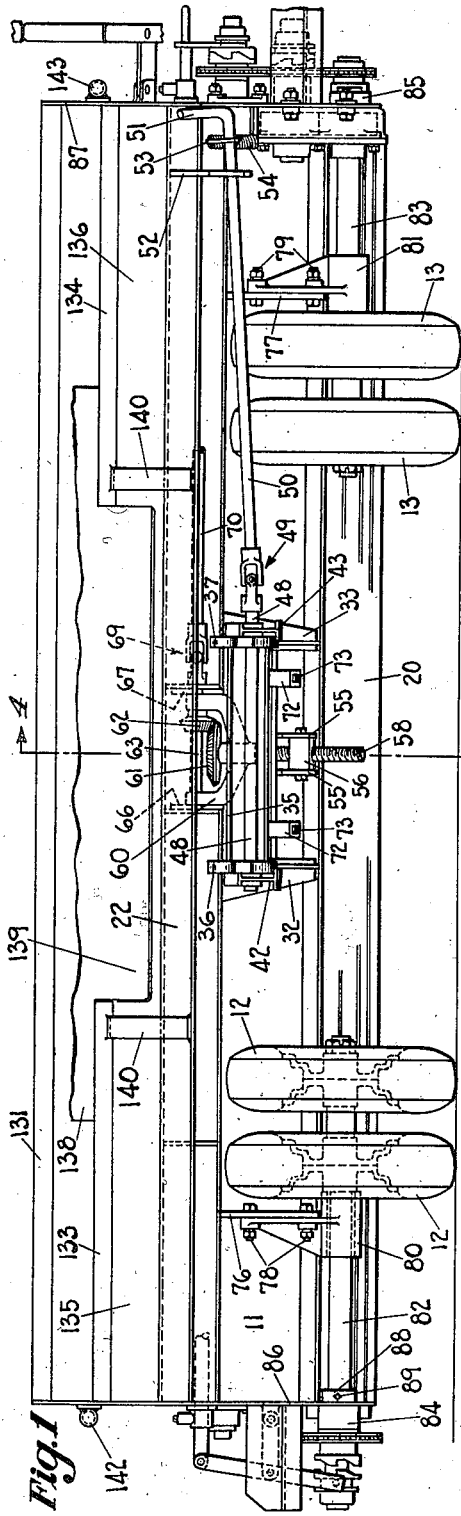
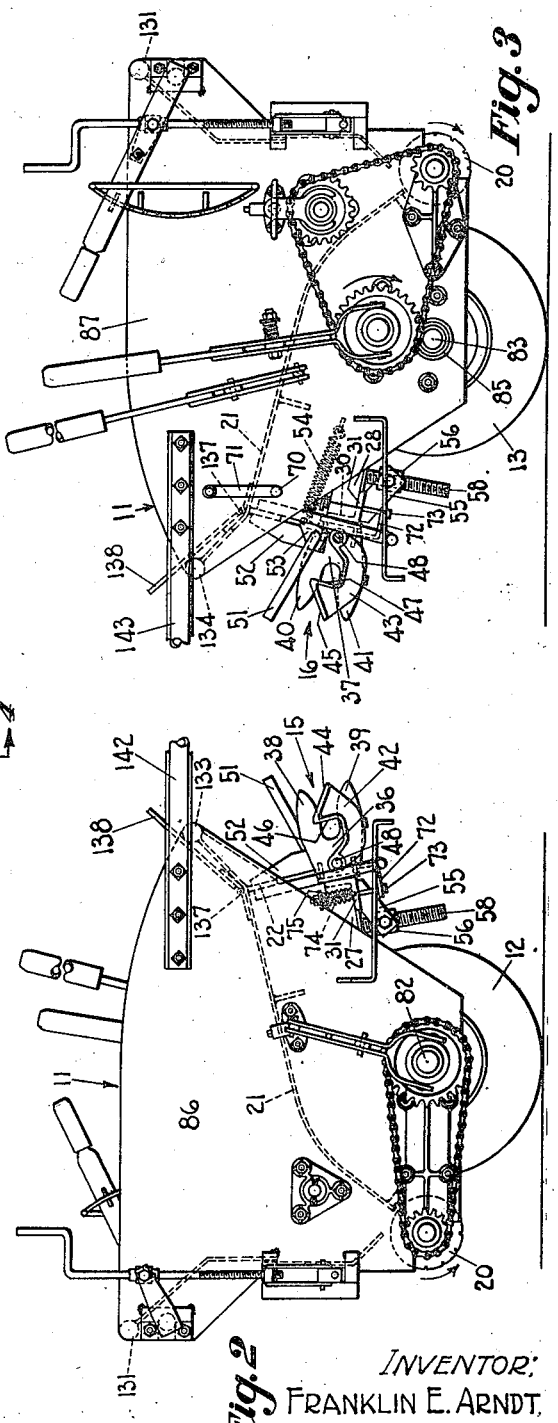
INVENTOR:
FRANKLIN E. ARNDT,
By Chas. M. Nissen,
           ATT'Y.

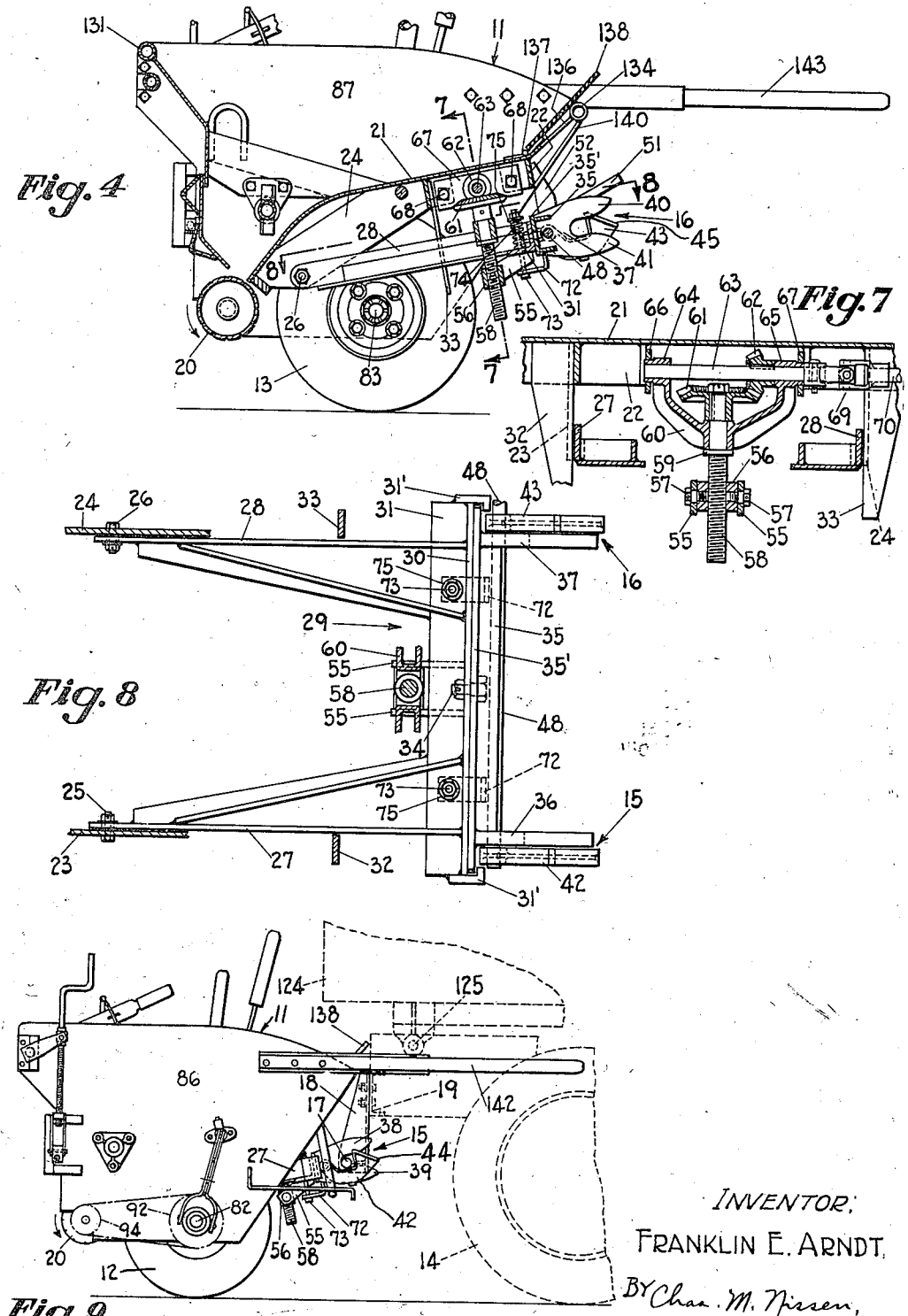

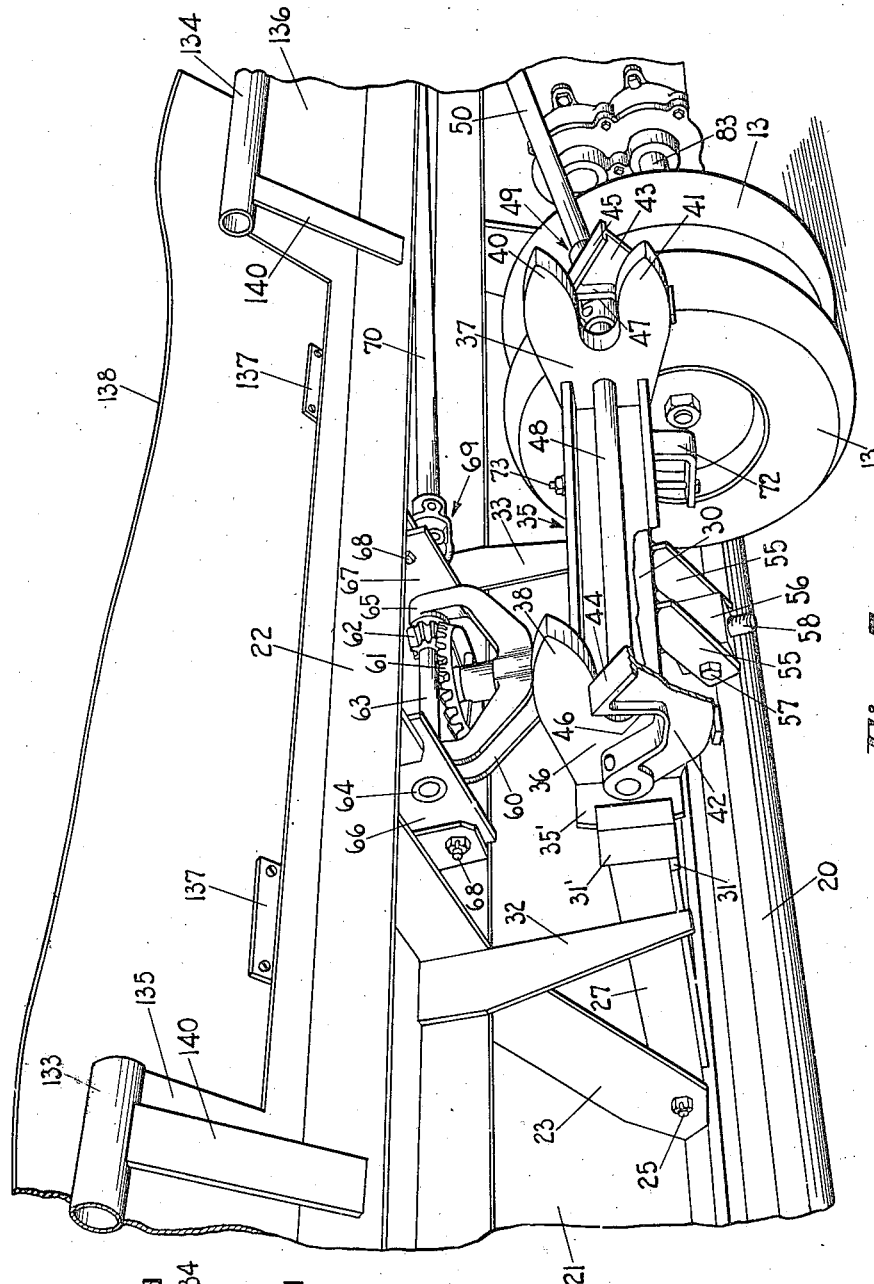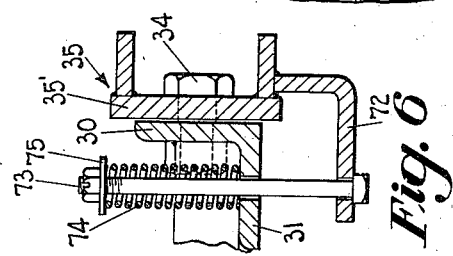

Patented Jan. 26, 1943

2,309,086

UNITED STATES PATENT OFFICE 2,309,086

MATERIAL SPREADER

Franklin E. Arndt, Galion, Ohio, assignor to The Galion Iron Works & Manufacturing Company, a corporation of Ohio Application June 30, 1939, Serial No. 282,242

16 Claims. (Cl. 280—33.10)

My invention relates to road material spreaders of the type which is adapted to be hitched to and hauled behind a dumping truck traveling along the roadway, and one of the objects of the invention is the provision of improved and efficient apparatus hitching a road material spreader to such truck, combined with means for adjusting at will the elevation of the hitching apparatus in accordance with the elevation of the drawbar at the rear end of the towing truck.

Other objects of the invention will appear hereinafter, the novel features and combinations being set forth in the appended claims.

This application is a continuation in part of my co-pending application, Serial No. 131,837, filed March 19, 1937, now Patent #2,252,690 issued Aug. 19, 1941, for an improvement in Material spreaders.

In the accompanying drawings,

Fig. 1 is a front elevation of the spreader embodying my improvements;

Fig. 2 is an elevational view of the left-hand end of Fig. 1;

Fig. 3 is an elevational view of the right-hand end of Fig. 1;

Fig. 4 is a cross-section taken on the line 4—4 of Fig. 1, looking in the direction of the arrows;

Fig. 5 is a perspective view looking from the right to the left as viewed in Fig. 4; and Fig. 6 is an enlarged sectional detailed view showing one of the centering springs and the mounting therefor.

Fig. 7 is a sectional view taken on the line 7—7 of Fig. 4, looking in the direction of the arrows;

Fig. 8 is a sectional plan view taken on the line 8—8 of Fig. 4;

Fig. 9 is a side elevational view of the spreader hitched to a drawbar at the rear end of a self-propelled dumping truck, the rear end of the latter being illustrated diagrammatically in dashed lines.

The hopper 11, as shown in Fig. 1, is adapted to extend substantially beyond both sides of the draft vehicle or self-propelled hauling dumping truck shown in dashed lines in Fig. 9. The hopper 11, as shown in Fig. 1, is supported upon the wheels 12, 13 which are set inwardly from the vertical end walls of the hopper so as to track just inside or just outside of the paths of travel of the wheels 14 of the truck shown in dotted lines in Fig. 9. That is to say, when hitching devices 15 and 16 at the front side of the spreader are connected, as shown in Fig. 9, to the drawbar 17 secured by means of the bracket structure 18, 19 to the rear end of the dumping truck, the wheels 12 and 13 of the spreader will travel along paths immediately outside or immediately inside of the paths of travel of the wheels 14 of the dumping truck.

The hopper 11 comprises an open top and an open bottom and below the latter is located the feed roll 20. The bottom wall 21 of the hopper slopes downwardly from the cross-piece 22 to the feed roll 20, as shown in Fig. 4. On the underside of the bottom wall 21 are secured by means of welding, the bracket plates 23, 24 to which are pivoted at 25, 26 the rearwardly extending arms 27, 28 of a U-shaped frame structure 29. This frame structure may comprise various plates welded together into one rigid unit, as shown in Fig. 8, and includes a vertical front cross-piece 30 and a horizontal front cross-piece 31.

Secured to the bottom of the hopper are vertical plates 32 and 33 at opposite sides of the frame structure 29, as shown in Fig. 8. The depending plates 32, 33 act as guiding abutments for the frame structure 29 to confine the latter to upright adjustments on the pivots 25, 26.

Pivoted at 34 to the center of the upright plate 30 is a cross-piece 35, U-shaped in cross-section as shown in Fig. 4. Welded to the ends of the cross-piece 35 are the upright jaw plates 36, 37, each having spaced-apart upper and lower fixed jaws. The jaw plate 36 comprises the upper jaw 38 and the lower jaw 39, as shown in Fig. 2. The jaw plate 37 comprises the upper jaw 40 and the lower jaw 41, as shown in Fig. 3. The jaws 38, 39 and 40, 41 are beveled to facilitate positioning of the drawbar 17, as shown in Fig. 9.

On the outside of the jaw plates 36, 37 are located the beveled latch plates 42, 43, as shown in Figs. 5 and 8. The latch plates 42, 43 are beveled at 44, 45 respectively, as shown in Figs. 2 and 3. The latch plates are also provided with hooking surfaces at 46, 47 in order to hold the drawbar 17 in the locked position shown in Fig. 5.

As shown in Fig. 8, the latch plates 42, 43 are pinned to the rock shaft 48 which is journaled in openings which extend laterally through the jaw plates 36, 37.

As shown in Fig. 1, the rock shaft 48 is connected by means of a universal joint 49 to the actuating rod 50 which is provided with a handle 51 within easy reach of the operator at the right-hand end of the spreader, as viewed in Fig. 1.

Secured to the upper front edge portion of the hopper is a bracket plate 52 provided with an opening for receiving the rod 50 so that the latter may have a journal support to co-operate with the universal joint 49 to support the rod 50 in the position shown in Fig. 1. Secured to the rod 50 is a bracket plate 53 to which is connected a spring 54 the lower end of which is secured below the bottom of the hopper near the right-hand end thereof as viewed in Fig. 1.

It can readily be seen by referring to Fig. 1 that when the rod 50 is rotated by means of the handle 51 in an anti-clockwise direction as viewed by the operator, the latch plates 42, 43 will be moved downwardly into positions to release the drawbar 17. (Fig. 9). When the handle 51 is released, the spring 54 will automatically return the latch plates to the position shown in Figs. 2 and 3. When the hitching devices are at a proper elevation from the road surface, the spreader may be pushed forward so that the beveled surfaces 44 and 45 of the latch plates will engage the drawbar 17 whereupon the latch plates will be automatically depressed against the action of the spring 54 until the drawbar 17 is in the position shown in Fig. 9, whereupon the spring 54 will snap the latch plates into their locking positions.

When the towing vehicle exerts a pull through the drawbar 17 on the hitching devices, the pivot bolt 34 need not take the entire pulling strain as the latter may be distributed between the bolt 34 and the L-shaped guide plates 31', 31' welded to the ends of the plates 30 and 31 and extended forwardly and inwardly in positions to form abutment guideways for the ends of the plate 35' forming the back of the cross-piece 35. In other words, the rigid structure comprising the cross-piece 35 and the jaw plates 36, 37, including the rear plate 35', may be pivoted at 34 and guided at its ends by the L-shaped plates 31', 31' which also serve as abutments to co-operate with the bolt at 34 to distribute the pull exerted from the hitching devices 15, 16.

In order to enable the drawbar 17 to be secured to the rear end of the dumping truck at fixed elevation relative to the road surface and to save the time necessary to adjust the elevation of the drawbar 17 relative to the road surface, I have provided means for adjusting the elevations of the hitching devices so as to be in accordance with the elevation of the drawbar on the dumping truck. Secured to and depending from the cross-piece 31 of the frame structure 29 are spaced-apart bracket plates 55, 55 between which is swiveled a nut 56, as shown in Figs. 1, 5, 7 and 8. The nut 56 may be swiveled to the plates 55, 55 by means of the cap screws 57, 57 shown in Fig. 7. Threaded through the nut 56 is the upright screw-threaded shaft 58. At the upper end of the screw-threaded portion of the shaft 58 is a collar 59 for supporting the double arm bracket 60. Immediately above the collar 59 the shaft 58 is journaled in the lower end of the bracket 60. To the upper end of the shaft 58 is keyed a bevel gear 61 which meshes with another bevel gear 62 keyed to the shaft 63, the ends of which are journaled in the bearings 64, 65 at the upper end portions of the bracket 60, as shown in Fig. 7.

The upper outer ends of the journal bearings 64, 65 are in turn journaled in openings in the plates 66, 67, as shown in Fig. 7. The plates 66, 67 are rigidly secured to the bottom plate 21 of the hopper and this may be done by means of bolts, as illustrated at 68, 68 in Fig. 4.

By means of a universal joint 69, the shaft 63 is connected to the actuating rod 70. The rod 70 may be extended through an opening in one of the lateral end walls of the hopper to an actuating handle 71 shown in Fig. 3.

When the spreader is to be hitched to the towing truck, the drawbar 17 may not be in parallelism with the rod 48 but such parallelism may be effected since the cross-piece 35 is pivoted at 34 to the front end of the frame structure 29. L-shaped brackets 72, 72 are secured to the underside of the cross-piece 35, as shown in Fig. 6, and these brackets extend rearwardly under the angle iron 30, 31. Bolts 73, 73 extend upwardly through the rearwardly extending portions of the brackets 72 and through openings in the plate 31. Springs 74 surround the bolts and rest on the plate 31 below the washers 75. When the cross-piece 35 is tilted on the pivot 34 one or the other of the springs 74 is compressed and consequently when hitching is effected with the drawbar 17 and rock shaft 48 out of parallelism, undue strain will not be transmitted to the frame structure 29 or to the hopper structure. Furthermore, the springs 74 always tend to center the cross-piece 35 or hold it in parallelism to the cross-pieces 30, 31. It will also be seen that when the towing truck travels along the roadway and the drawbar 17 tilts transversely thereof, the springs 74 act as shock absorbers between the rear end of the truck and the hopper structure.

Secured to the under side of the hopper are the bracket plates 76, 77, as shown in Fig. 1. Bolted at 78, 79 to the bracket plates 76, 77 are the journal bearings 80, 81 for the inwardly extending supporting wheel shafts 82, 83. The wheels 12 and 13 are keyed to the shafts 82 and 83 to rotate therewith.

The outer ends of the shafts 82 and 83 are journaled in bearings 84, 85 which are secured to the end walls of the elongated hopper. Bearing against the inner wall of the end plate 86 of the hopper is a collar 88 which is secured to the shaft 82 by means of a set screw 89, as shown in Fig. 1.

It should be particularly noted that the feed roll 20 always rotates in delivery direction whether the spreader is moved forwardly or rearwardly along the roadway. That is to say, the feed roll 20 always rotates in the direction of the arrow shown in Fig. 3 or in the direction of the arrow shown in Fig. 2, irrespective of the direction of travel of the spreader. The mechanism to secure these results are fully disclosed and claimed in my co-pending application Serial No. 360,588, filed October 10, 1940, as a division of the instant application.

Reinforcement of the hopper may be effected by providing a pipe 131 along the entire length of the rear edge of the hopper, this pipe being welded at its ends to the end plates 86, 87 and also welded along its length to the rear upper edge of the rear inclined wall, as shown in Fig. 4. Reinforcing pipes 133, 134 may be welded to the upper edges of the plates 135 and 136. Hinged at 137, as shown in Figs. 4 and 5, is a sheet 138 of flexible material, such as rubber, to close the open space afforded by the cut-away portion 139 of Fig. 1. Near such cut-away portion additional support for the pipes 133 and 134 may be afforded by plate supports, shown at 140 in Figs. 4 and 5.

Handle bars 142 and 143 are connected to the front portions of the end plates 86, 87 to extend forwardly along opposite sides of the dumping truck, as shown in Fig. 9. Even after hitching has been effected, as shown in Fig. 9, the screw shaft 58 may be rotated so as to tilt the hopper on the axis of the wheels 12, 13. By referring to Fig. 4, it will be seen that if the hitching mechanism remains at fixed relation by reason of the drawbar 17 of Fig. 9 being at fixed elevation, operation of the screw shaft 58 will tilt the hopper and therefore vary the elevation of the feed roll 29. However, the main purpose of the mechanism for adjusting the elevation of the hitching mechanism is to accommodate the hitching mechanism to whatever height the drawbar of the towing truck may have, and in this way maintain the upper open side of the hopper approximately horizontal for maximum capacity when receiving material from the dumping truck.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Hitching mechanism for a material spreader comprising the combination with a frame adapted to be pivoted on a horizontal axis to such spreader, of a nut swiveled to said frame, a screw rod threaded through said nut, a journal bearing for said rod, a support for said journal bearing, mechanism for pivotally suspending said support on a horizontal axis extending transversely of said first-named axis, bevel gearing for turning said screw rod, hitching mechanism carried by said frame to swing up and down bodily therewith, and means adapted to be mounted on the spreader for driving said bevel gearing from one lateral end of the spreader.

2. Hitching mechanism for a material spreader comprising the combination with a U-shaped frame adapted to have its legs pivoted on horizontal axes to such spreader, of mechanism connected to the forward central portion of said frame and adapted to be connected to the spreader for swinging the frame up and down on said horizontal axes, a cross-bar pivoted to the forward central portion of said frame on a longitudinally extending axis, spaced hitching devices mounted on the ends of said cross-bar, means adapted to be connected to such spreader to extend to one of the lateral ends thereof for operating the swinging mechanism, and means for releasing the hitching devices.

3. Hitching mechanism for a material spreader comprising a frame adapted to be connected to such spreader, a cross-piece pivotally connected to said frame on a longitudinal axis, one end of said cross-piece being elevated while the other is lowered when tilted on such axis, coupling devices carried by the ends of said cross-piece, and resilient mechanism between said cross-piece and said frame for yieldingly limiting the pivotal movement of said cross-piece relatively to said frame and thereby limiting the elevation of one coupling device and the lowering of the other.

4. Hitching mechanism for a material spreader comprising the combination with a frame adapted to be connected to such spreader, of a cross-piece pivoted to the forward end of said frame on a longitudinal axis to permit one end of said cross-piece to be elevated while the other end is lowered, spring-pressed mechanism between the forward end of said frame and said cross-piece on opposite sides of the pivot thereof for yieldingly holding said cross-piece in a predetermined position relative to said frame, and coupling mechanism carried by said cross-piece and held yieldingly centered by said spring-pressed mechanism.

5. Hitching mechanism for a material spreader comprising the combination with a frame adapted to be connected to such spreader, of a cross-piece pivoted to the forward end of said frame to permit tilting of said cross-piece up and down, coupling mechanism carried by said cross-piece for up and down tilting movements therewith, and centering means for said coupling mechanism connecting the forward end of said frame to the underside of said cross-piece at spaced-apart points and comprising upright springs having their lower ends in engagement with the forward end of said frame.

6. Hitching mechanism for a material spreader comprising the combination with a frame adapted to be connected to such spreader, of a cross-piece pivoted to said frame for up and down tilting movements relatively thereto, coupling mechanism mounted on said cross-piece for up and down tilting movements relatively thereto, and centering means for said coupling mechanism comprising spaced apart upright springs and mechanism connecting them between the forward end of said frame and said cross-piece at spaced apart points thereon.

7. Hitching mechanism of the class described comprising a frame, a cross-piece connected to the forward end of said frame, brackets extending under said frame from the bottom of said cross-piece, springs on the forward end of said frame, bolts extending upwardly through said brackets and said frame for association with said springs, and coupling mechanism carried by said cross-piece and held yieldingly centered by said springs and bolts.

8. Hitching mechanism of the class described comprising the combination with a U-shaped frame having arms adapted to be pivotally mounted, of mechanism for mounting the forward portion of the U-shaped frame for adjustment in elevation, a cross-piece pivotally connected to the front side of said frame, coupling mechanism on said cross-piece for connection to a drawbar of a towing vehicle, retaining extensions from the ends of said transverse structure to the front sides of the ends of the said cross-piece, and resilient mechanism for yieldingly limiting the tilting of said cross-piece on its pivot relatively to said U-shaped frame.

9. Hitching mechanism of the class described comprising the combination with a pivoted frame, of hitching mechanism carried thereby, a nut carried by said frame, a screw-threaded shaft threaded through said nut, a supplemental frame adapted to be pivotally mounted for oscillation in accordance with the pivotal movements of said first-named frame, and means comprising bevel gearing carried by said supplemental frame and connected to said screw-threaded shaft to effect adjustment in elevation of said hitching mechanism.

10. Hitching mechanism for a spreader having a hopper, comprising the combination with a frame adapted to be mounted under such hopper for adjustment in elevation relative thereto, spaced-apart abutment guides adapted to be connected to such hopper to depend from the bottom thereof in close association with the sides of said frame, hitching mechanism at the forward end of said frame, and means adapted to be mounted on the hopper and connected to said frame to effect adjustment in elevation of said hitching mechanism.

11. Hitching mechanism for a spreader having a hopper, comprising the combination with a frame adapted to be pivotally connected to such hopper on a horizontal transverse axis, of a cross-bar pivoted to said frame on a longitudinal axis, spaced-apart coupling devices on the ends of said cross-bar in position for coupling a drawbar of a towing vehicle to said cross-piece and frame, mechanism adapted to be connected between such hopper and said frame to adjust the forward end of said frame in elevation on said horizontal axis and thereby adjust the elevation of said spaced-apart coupling devices in accordance with the elevation of the drawbar of the towing vehicle, and mechanism adapted to be connected to the hopper to extend to one lateral end thereof for actuating from such lateral end said adjusting mechanism.

12. Hitching mechanism for a material spreader having a hopper comprising the combination with a frame adapted to be supported from the underside of such hopper for adjustment in elevation relative thereto, abutment guides adapted to be mounted on the bottom of the hopper to depend therefrom in spaced-apart relation and in close association with the outer sides of said frame, coupling mechanism mounted on the forward end of said frame to move bodily up and down therewith, and means adapted to be mounted on the hopper and connected to said frame to effect adjustment in elevation of the coupling mechanism.

13. Hitching mechanism for a material spreader having a hopper, comprising the combination with a frame adapted to have its rear end pivotally connected to the underside of such hopper, of mechanism adapted to be connected between the bottom of such hopper and the forward central portion of said frame for adjusting the elevation of the forward end of the frame, a cross-piece pivotally connected to the front end of said frame, coupling mechanism on said cross-piece for connection to a drawbar of a towing vehicle, retaining extensions from the lateral ends of the front end of said frame to the front sides of the lateral ends of said cross-piece, and resilient mechanism for yieldingly limiting the tilting of the cross-piece on its pivot relatively to said frame.

14. Hitching mechanism for a material spreader having a hopper, comprising the combination with a frame adapted to be pivotally connected to such hopper and having a cross-piece at its forward end, a transverse bar pivoted to said cross-piece on a longitudinal axis, centering mechanism between said cross-piece and said transverse bar to hold the same yieldingly in parallelism, hitching mechanism connected to said transverse bar, and means for swinging said frame on its pivot to adjust the elevation of the hitching mechanism.

15. Hitching mechanism for a material spreader having a hopper, comprising the combination with a frame adapted to be pivoted on a horizontal axis to the bottom of such hopper, of means comprising nut and screw mechanism adapted to be suspended from the bottom of such hopper for swinging said frame on said horizontal axis, a transverse bar pivoted to said frame on a longitudinal axis, resilient centering mechanism between said frame and said transverse bar, and hitching mechanism mounted on said transverse bar.

16. Hitching mechanism for a material spreader having a hopper extended laterally beyond the path of travel of the wheels of a towing dumping truck, comprising the combination with a frame adapted to be pivoted to the under side of such hopper for adjustment in elevation of the forward end of said frame, of a cross-piece pivoted to said frame for up and down tilting movements relatively thereto, self-latching coupling devices on said cross-piece spaced-apart for connection to a drawbar on the towing dumping truck, resilient mechanism for yieldingly centering the coupling devices relative to said frame, mechanism adapted to be operated from one lateral end of such hopper for adjusting said frame on its pivotal connection to the under side of said hopper to effect adjustment in elevation of said coupling devices relative to the drawbar on the towing dumping truck, and means adapted to be operated from the lateral end of the hopper for unlatching said coupling devices to release the same from said drawbar, the construction and arrangement of the hitching mechanism being such that when connected to the hopper of a spreader as aforesaid the increased capacity of the hopper due to the lateral extensions thereof may be maintained by adjustments of the coupling mechanism to keep the open top of the hopper approximately horizontal during dumping from the towing dumping truck and during spreading operations of material from the hopper.

FRANKLIN E. ARNDT.